(12) United States Patent
Login

(10) Patent No.: US 9,953,336 B2
(45) Date of Patent: Apr. 24, 2018

(54) COMMUNICATION OF REWARD DATA BETWEEN APPLICATIONS

(71) Applicant: OUTFIT7 LIMITED, London (GB)

(72) Inventor: Samo Login, Pissouri (CY)

(73) Assignee: Outfit7 Limited, London (GB)

(*) Notice: Subject to any disclaimer, the term of this patent is extended or adjusted under 35 U.S.C. 154(b) by 570 days.

(21) Appl. No.: 14/303,055

(22) Filed: Jun. 12, 2014

(65) Prior Publication Data
US 2015/0363815 A1 Dec. 17, 2015

(51) Int. Cl.
G06Q 30/00 (2012.01)
G06Q 30/02 (2012.01)

(52) U.S. Cl.
CPC ..... *G06Q 30/0226* (2013.01); *G06Q 30/0209* (2013.01); *G06Q 30/0214* (2013.01)

(58) Field of Classification Search
None
See application file for complete search history.

(56) References Cited

U.S. PATENT DOCUMENTS

| 6,099,408 A | 8/2000 | Schneier et al. |
| 6,264,557 B1 | 7/2001 | Schneier et al. |
| 6,571,216 B1 | 5/2003 | Garg et al. |
| 7,761,327 B1 | 7/2010 | Hannah et al. |
| 8,700,455 B2 | 4/2014 | Michael |
| 8,814,703 B2 | 8/2014 | McCaffrey et al. |
| 8,821,294 B2 | 9/2014 | McCaffrey et al. |
| 8,825,525 B2 | 9/2014 | Carpenter et al. |
| 8,834,276 B2 | 9/2014 | McCaffrey et al. |
| 2002/0002076 A1 | 1/2002 | Schneier et al. |

(Continued)

FOREIGN PATENT DOCUMENTS

| WO | WO 2009/126316 A1 | 10/2009 |
| WO | WO 2011/035442 A1 | 3/2011 |

(Continued)

OTHER PUBLICATIONS

Partial European Search Report dated Feb. 9, 2015 in Patent Application No. 14172199.3.

(Continued)

*Primary Examiner* — Meredith A Long
(74) *Attorney, Agent, or Firm* — Oblon, McClelland, Maier & Neustadt, L.L.P.

(57) ABSTRACT

There is provided a scheme of communicating reward data from a first application running on a data processing device (100) to a second application on the data processing device (100) for use by the second application. The method comprises the first application obtaining a reward value in response to a user of the first application completing a predetermined task in the first application. In response to a request from the user to claim a reward, the first application generates and transmits: an instruction to place the second application into an interactive state; and reward data, which is generated on the basis of the reward value, for use by the second application in the interactive state. The passing of the reward value from the first application to the second application occurs within the data processing device (100), with no communication between the data processing device (100) and the backend server (200) via the Internet (400) taking place.

6 Claims, 13 Drawing Sheets

(56) References Cited

U.S. PATENT DOCUMENTS

| | | |
|---|---|---|
| 2004/0092310 A1 | 5/2004 | Brosnan et al. |
| 2004/0166931 A1 | 8/2004 | Criss-Puszkiewicz et al. |
| 2006/0281541 A1 | 12/2006 | Nguyen et al. |
| 2006/0287106 A1 | 12/2006 | Jensen |
| 2008/0090628 A1 | 4/2008 | Mueller et al. |
| 2008/0167106 A1 | 7/2008 | Lutnick et al. |
| 2009/0299817 A1 | 12/2009 | Fok et al. |
| 2010/0146502 A1 | 6/2010 | Zalewski |
| 2011/0250949 A1 | 10/2011 | van Os et al. |
| 2012/0035990 A1 | 2/2012 | Lewis et al. |
| 2012/0036003 A1 | 2/2012 | Tong et al. |
| 2012/0315993 A1 | 12/2012 | Dumont et al. |
| 2013/0006773 A1 | 1/2013 | Lutnick et al. |
| 2013/0117084 A1 | 5/2013 | Rooke et al. |
| 2013/0143669 A1 | 6/2013 | Muller |
| 2013/0151342 A1 | 6/2013 | Citron et al. |
| 2013/0185133 A1 | 7/2013 | Tong et al. |
| 2013/0219426 A1 | 8/2013 | Zweig et al. |
| 2013/0304580 A1 | 11/2013 | Feadler et al. |
| 2013/0324259 A1 | 12/2013 | McCaffrey et al. |
| 2013/0324260 A1 | 12/2013 | McCaffrey et al. |
| 2013/0325573 A1 | 12/2013 | Park et al. |
| 2013/0339228 A1 | 12/2013 | Shuster et al. |
| 2014/0058811 A1 | 2/2014 | Gorowitz et al. |
| 2014/0058812 A1 | 2/2014 | Bender et al. |
| 2014/0089068 A1 | 3/2014 | Yehezkel et al. |
| 2014/0095874 A1* | 4/2014 | Desai ................ H04L 63/0815 713/168 |
| 2014/0278853 A1 | 9/2014 | Brown et al. |
| 2014/0324562 A1 | 10/2014 | Tong et al. |
| 2014/0337831 A1 | 11/2014 | Katagai et al. |

FOREIGN PATENT DOCUMENTS

| | | |
|---|---|---|
| WO | WO 2012/019072 A1 | 2/2012 |
| WO | WO 2013/118629 A1 | 8/2013 |
| WO | WO 2013/158033 A1 | 10/2013 |
| WO | WO 2014/074945 A1 | 5/2014 |

OTHER PUBLICATIONS

International Search Report and Written Opinion dated Sep. 4, 2015 in PCT/EP2015/062916.

Extended European Search Report dated Sep. 7, 2015 in Patent Application No. 14172199.3.

U.S. Appl. No. 14/560,523, filed Dec. 4, 2014, Login et al.

* cited by examiner

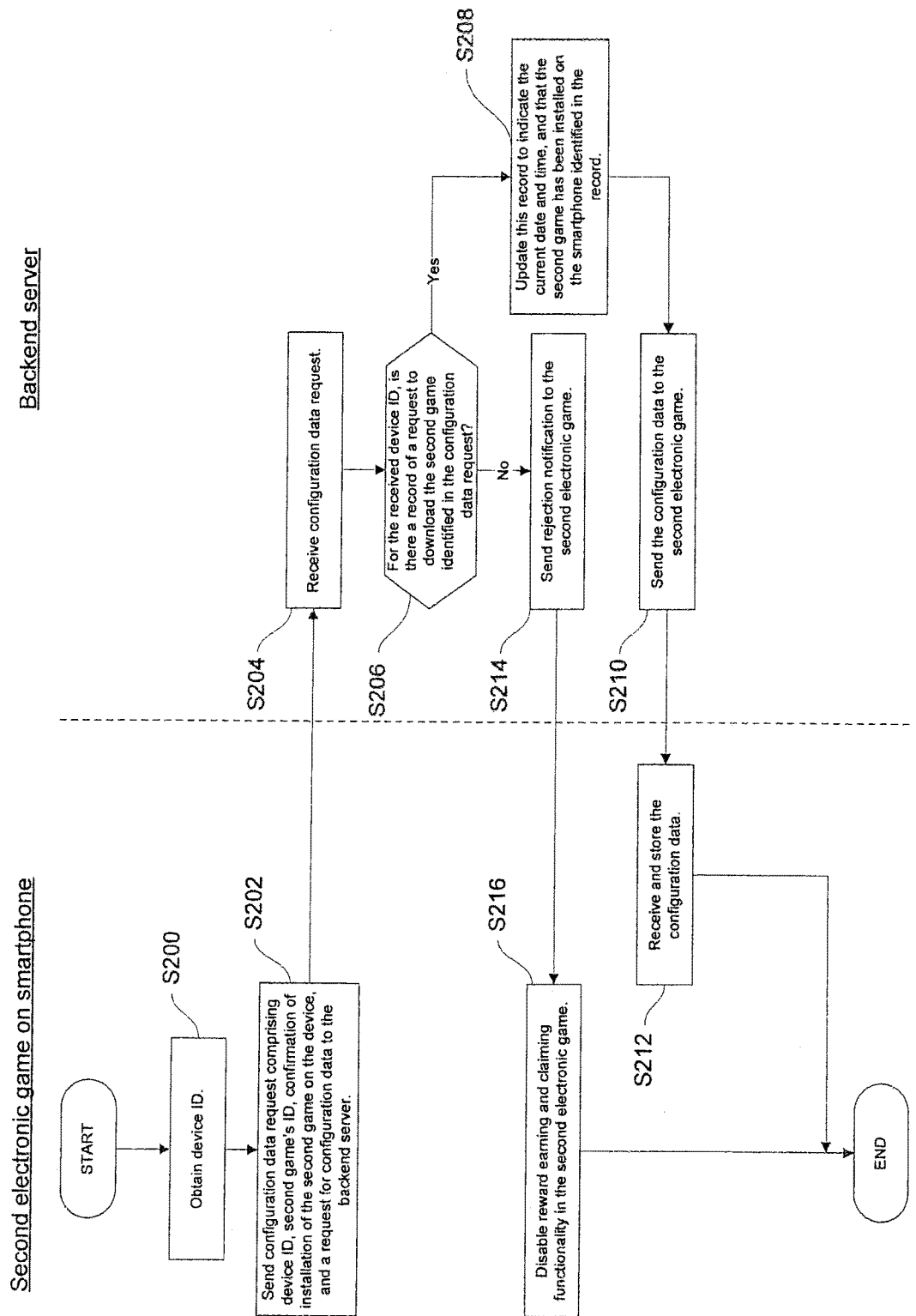

COMMUNICATION OF REWARD DATA BETWEEN APPLICATIONS

TECHNICAL FIELD

The present invention generally relates to the field of data communication between computer applications and, more specifically, to a computer-implemented scheme of communicating reward data relating to a reward earned by the user of a first application to a second application for use by the second application.

BACKGROUND

There has been growing interest in systems for providing cross-promotional functionality between applications (commonly referred to as "apps"), which allow the user to claim and use a reward, which he/she has earned while using one application, in another application. Systems of this kind are described in US 2013/0324259 A1 and US 2013/0324260 A1, for example.

Known systems for providing automated cross-promotions between electronic games have made use of a cross-promotional engine on a server that connects to users' electronic devices via the Internet to track each user's progress and their cross-promotional rewards. In these systems, reward definitions relating to rewards that a user has obtained while using a first application are sent to the cross-promotional engine, which stores the received reward definitions for subsequent retrieval by a second application which the user may open and use to claim their reward. These systems have the advantage of being versatile in that the second application need not run on the same device as the first application, allowing the user to benefit from using applications on a variety of different devices (e.g. their home PC, smartphone, laptop computer etc.).

SUMMARY

Despite the benefits of known cross-promotional systems mentioned above, the present inventor has recognised that the process of claiming the reward in these systems requires the device via which the reward is being claimed to connect to the cross-promotional engine via the Internet, which may not always be convenient or possible for the user. In view of this shortcoming of known cross-promotional systems, the present inventors have devised a scheme of securely communicating reward data between applications on a device that does not require the device to connect to the Internet, or any other kind of network, or any other device.

More particularly, the present inventor has devised a non-transitory storage medium storing computer program instructions which define a first application and which, when executed by a data processing device, cause the data processing device to communicate within the data processing device reward data from the first application to a second application on the data processing device for use by the second application, by obtaining a reward value in response to a user of the first application completing a predetermined task in the first application and, in response to a request from the user to claim a reward, generating and transmitting: an instruction to place the second application into an interactive state; and reward data, the reward data being generated on the basis of the reward value for use by the second application.

The present inventor has further devised a non-transitory storage medium storing computer program instructions which define a first application and which, when executed by a data processing device, cause the data processing device to process reward data comprising a reward value that is indicative of a reward earned by a user of a second application on the data processing device upon completing a predetermined task in the second application, by: passively receiving the reward data in response to at least one of an operating system of the data processing device and the second application pushing the reward data to the first application; extracting the reward value from the received reward data; and using the extracted reward value in the first application.

The present inventor has further devised a method of communicating reward data from a first application running on a data processing device to a second application on the data processing device for use by the second application, the method comprising the first application performing processes of: obtaining a reward value in response to a user of the first application completing a predetermined task in the first application; and in response to a request from the user to claim a reward, generating and transmitting: an instruction to place the second application into an interactive state; and reward data, the reward data being generated on the basis of the reward value for use by the second application in the interactive state.

The present inventor has further devised a method of processing reward data generated by a first application and comprising a reward value that is indicative of a reward earned by a user of the first application upon completing a predetermined task in the first application, the method comprising a second application that runs on the same data processing device as the first application processing the reward data by: passively receiving the reward data in response to at least one of an operating system of the data processing device and the first application pushing the reward data to the second application; extracting the reward value from the received reward data; and using the extracted reward value in the second application.

The present inventor has further devised a server operable to communicate with a data processing device via the Internet. The server comprises a receiver module operable to receive from a first application running on the data processing device a resource locator request requesting a resource locator for downloading from an application download server a second application which is to be installed on the data processing device, the resource locator request comprising: a unique device identifier that uniquely identifies the data processing device; a first identifier identifying the first application; and a second identifier identifying the second application. The server further comprises a record keeping module arranged to create a record associating the unique device identifier with the first and second identifiers, and a transmission module arranged to transmit the requested resource locator to the data processing device. The receiver module is further operable to receive from the second application, after the second application has been installed on the data processing device, a request to receive configuration data from the server to enable the second application to provide the first application with an indication of a reward earned by a user upon completing a predetermined task in the second application, wherein the configuration data comprises the first identifier, and wherein the request to receive configuration data comprises the unique device identifier and the second identifier. The server further comprises a verification module arranged to verify validity of the request to receive configuration data by checking the unique device identifier and the second identifier in the request to receive configuration data against the record created by the record keeping module, and a configuration data generating module arranged to generate the requested configuration data when the verification module verifies the validity of the request to receive configuration data. The transmission module is further arranged to transmit the generated configuration data to the data processing device.

The present inventor has further devised a non-transitory storage medium storing computer program instructions which, when executed by a data processing device, cause the data processing device to communicate with a second data processing device via the Internet, by:
  receiving from a first application running on the second data processing device a resource locator request requesting a resource locator for downloading from an application download server a second application which is to be installed on the second data processing device, the resource locator request comprising:
  a unique device identifier that uniquely identifies the second data processing device;
  a first identifier identifying the first application; and
  a second identifier identifying the second application;
  creating a record associating the unique device identifier with the first and second identifiers;
  transmitting the requested resource locator to the second data processing device;
  receiving, after the second application has been installed on the second data processing device, a request from the second application to receive configuration data from the data processing device to enable the second application to provide the first application with an indication of a reward earned by a user upon completing a predetermined task in the second application, wherein the configuration data comprises the first identifier, and wherein the request to receive configuration data comprises the unique device identifier and the second identifier;
  verifying validity of the request to receive configuration data by checking the unique device identifier and the second identifier in the request to receive configuration data against the created record;
  generating the requested configuration data when the validity of the request to receive configuration data has been verified; and
  transmitting the generated configuration data to the second data processing device.

The present inventor has further devised a method performed by a first data processing device to communicate with a second data processing device via the Internet, the method comprising:
  receiving from a first application running on the second data processing device a resource locator request requesting a resource locator for downloading from an application download server a second application which is to be installed on the second data processing device, the resource locator request comprising:
  a unique device identifier that uniquely identifies the second data processing device;
  a first identifier identifying the first application; and
  a second identifier identifying the second application;
  creating a record associating the unique device identifier with the first and second identifiers;
  transmitting the requested resource locator to the second data processing device;
  receiving from the second application, after the second application has been installed on the second data processing device, a request to receive configuration data from the data processing device to enable the second application to provide the first application with an indication of a reward earned by a user upon completing a predetermined task in the second application, wherein the configuration data comprises the first identifier, and wherein the request to receive configuration data comprises the unique device identifier and the second identifier;
  verifying validity of the request to receive configuration data by checking the unique device identifier and the second identifier in the request to receive configuration data against the created record;
  generating the requested configuration data when the validity of the request to receive configuration data has been verified; and
  transmitting the generated configuration data to the second data processing device.

BRIEF DESCRIPTION OF THE DRAWINGS

Embodiments of the invention will now be explained in detail, by way of example only, with reference to the accompanying figures, in which:

FIG. 5 is a flow diagram illustrating processes performed by the backend server and by another application in the form of a second electronic game described herein, when the second electronic game starts up for the first time after its installation;

DETAILED DESCRIPTION OF EMBODIMENTS

Figure 1:
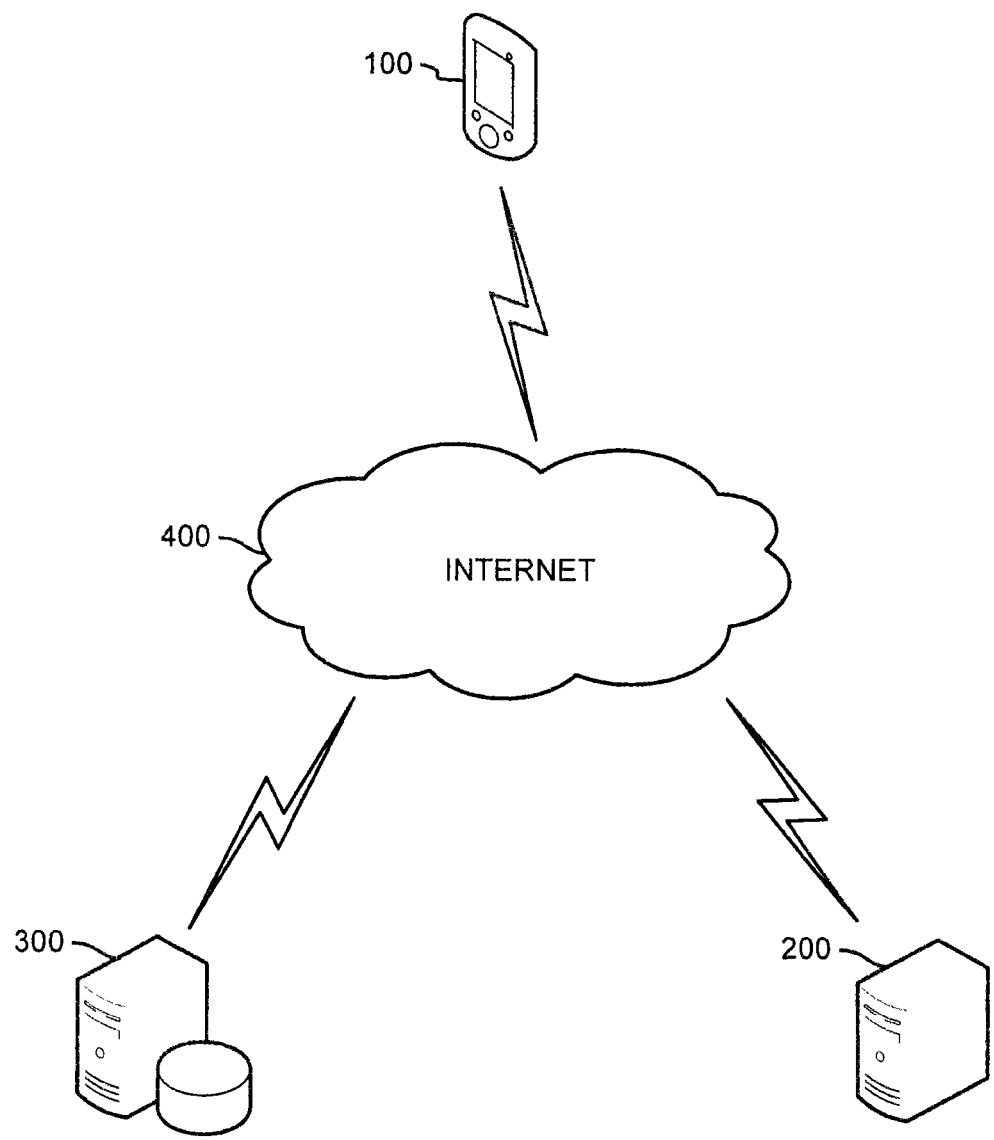
FIG. 1 is schematic illustration of a system according to an embodiment of the present invention.

FIG. 1 provides a schematic illustration of a system according to an embodiment of the present invention, comprising a data processing device 100 that is operable to communicate with a backend server 200 and an application download server 300 via a network such as the Internet 400. Aspects of the configuration of the data processing device 100, the backend server 200 and the application download server 300 that are helpful for understanding the present invention are described in detail below, while the description of other aspects, which will be familiar to those skilled in the art, is omitted for the sake of clarity. Functional components of the data processing device 100 are illustrated in FIG. 2A, while those of the backend server 200 are illustrated in FIG. 2B.

Figure 2A:
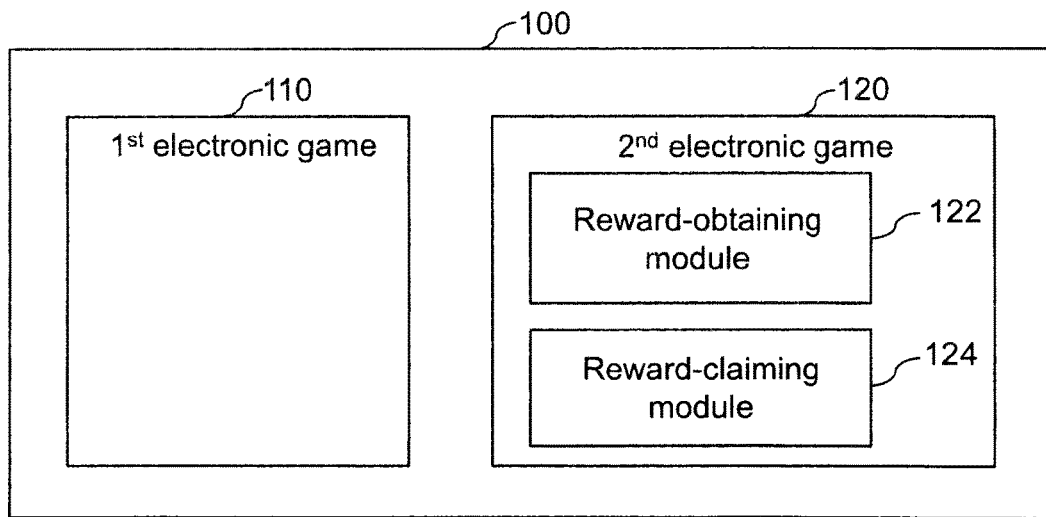
FIG. 2A is a schematic illustration of functional components provided in the data processing device 100 shown in FIG. 1.
Figure 2B:
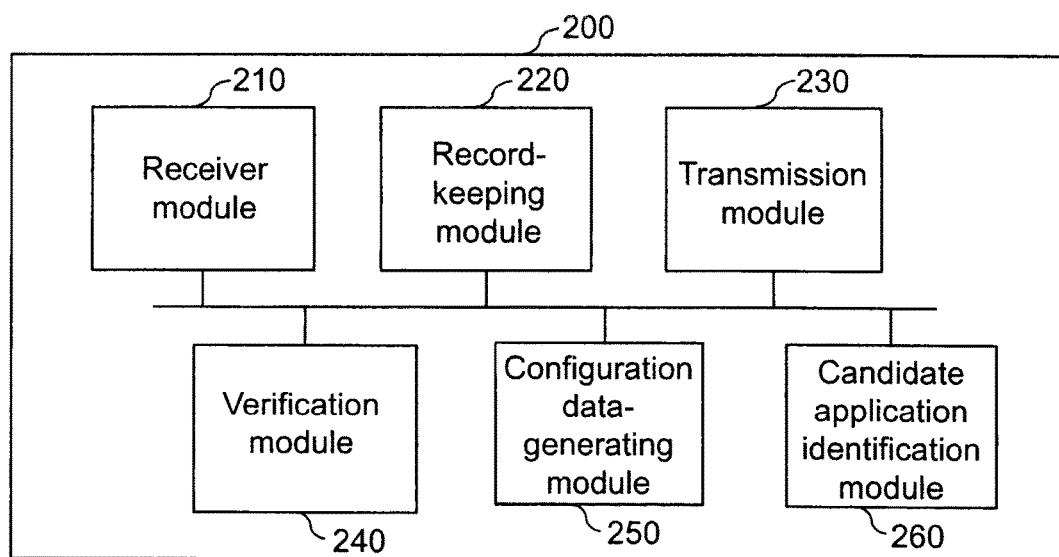
FIG. 2B is a schematic illustration of functional components provided in the backend server 200 also shown in FIG. 1.

The data processing device 100 of the present embodiment takes the exemplary form of a smartphone, onto which a primary application 110 in the exemplary form of a first electronic game has been downloaded from an application download server 300 (e.g. from the iTunes Store® or Google Play® store), as illustrated in FIG. 2A. During the course of the operations performed by the smartphone described below, a secondary application 120 in the exemplary form of a second electronic game is selected using the first electronic game, and then downloaded and installed onto the smartphone, and run to allow the user to earn rewards (e.g. virtual currency in the form of coins, jewels, moves etc.) in the second electronic game which may be passed to the first electronic game without the need for the smartphone to have a connection to the Internet 400 or any other kind of network, or to any other device, and which may be used in the first electronic game. It should be noted that the rewards used by the primary application 110 need not be of the same kind as the rewards used by the secondary application 120. In cases where the types of these rewards are different (e.g. the first electronic game recognises rewards in the form of gold coins, while the second electronic game rewards the user for completed tasks with rewards in the form of crystals), a conversion of the reward earned in the secondary application 120 to a form recognised by the primary application 110 may be performed, as described below.

It will be appreciated that the teachings herein are more generally applicable to many other kinds of data processing device, and many other kinds of application. For example, the data processing device 100 may be provided in the alternative form of a personal digital assistant (PDA), a tablet computer, laptop computer or a desktop PC, for example. Furthermore, the primary and secondary applications are not limited to being electronic games but may be any other kind of application that makes use of some kind of reward. As another example, the primary application 110 may be a mobile application for booking holidays (herein referred to as the "holiday booking app"), and the secondary application may be a mobile app for leaving reviews of hotels advertised in the holiday booking app (herein referred to as the "review app"), where the holiday booking app rewards the user with a reward in the form of a discount for using the review app to leave a review of one of the advertised hotels. It will become apparent from the following that the scheme for communicating reward data between applications on a data processing device 100 described herein can find many other interesting applications.

As also illustrated in FIG. 2A, the secondary application 120 comprises a reward-obtaining module 122 for generating rewards for the user, and a reward-claiming module 124 for placing the primary application 110 into an interactive state and passing the earned reward to the primary application 110 when in the interactive state. The functionalities of the reward-obtaining module 122 and the reward-claiming module 124 are described in detail below.

In the present embodiment, the reward-obtaining module 122 is configured to obtain the reward value by generating it in response to the user completing a predetermined task in the secondary application 120. Thus, the secondary application of the present embodiment, and other applications having a reward-obtaining module that is configured to obtain the reward value in this way, are referred to as "reward-generating applications". However, the reward-obtaining module 122 may obtain the reward value in a different way, for example by communicating with the backend server 200 to cause the backend server 200 to generate the reward value and transmit the reward value to the smartphone. This alternative way of obtaining the reward value is described further below.

Functional components of the backend server 200 are illustrated in FIG. 2B. As shown in the FIG. 2B, the backend server 200 comprises a receiver module 210, a record-keeping module 220, a transmission module 230, a verification module 240, a configuration data-generating module 250 and a candidate application identification module 260, which are arranged so as to be capable of exchanging information with one another. The functionalities of these components of the backend server 200 are also described in detail below. The backend server 200 also includes a backend server database, which stores sets of relations between various parameters relating to the primary application 110, the secondary application 120, reward claims made by the user, as well as a blacklist of reward-generating applications that may be used to generate rewards for use in the primary application 110.

A representation of the information stored in the backend server database is provided in Tables 1 to 5 below. The following Legend is provided as an aid for interpreting the information in Tables 1 to 5.

LEGEND

| Table Name | | | |
|---|---|---|---|
| Field Name<br>Field Type | Field Name<br>Field Type | Field Name<br>Field Type | ....<br>... |
| Record 1<br>Record 2 | | | |
| . | | | |
| . | | | |

TABLE 1

Reward-generating applications

| RGAppID<br>String | RGAppName<br>String | Vendor<br>String | DownloadLink<br>String | ....<br>... |
|---|---|---|---|---|
| RG1 | RGName1 | Vendor1 | Link1 | |
| RG2 | RGName2 | Vendor2 | Link2 | |

TABLE 2

| Black-listed applications | |
|---|---|
| RGAppID | ... |
| Int | ... |
| RG3 | |
| RG4 | |

TABLE 3

| Primary applications | | | | | |
|---|---|---|---|---|---|
| PAppID | PAppName | URLschema_packageName | assetDetails | Vendor | ... |
| Int | String | String | String | String | ... |
| P1 | PName1 | URL1 | Details1 | Vendor3 | |
| P2 | PName2 | URL2 | Details2 | Vendor4 | |

TABLE 4

| App Associations | | | | | | |
|---|---|---|---|---|---|---|
| DeviceID | RGAppID | PAppID | DownloadRequested Yes/No (Default: No) | Appinstalled Yes/No (Default: No) | DateOfInstall Datetime | ... ... |
| Int | Int | Int | | | | |
| ID1 | RG1 | P1 | Yes | Yes | Date1 | |
| ID1 | RG2 | P2 | Yes | No | | |

TABLE 5

| Claims | | | | | | |
|---|---|---|---|---|---|---|
| ClaimID | RewardAmount | RGAppID | PAppID | DeviceID | ClaimingApp | ... |
| Int | Int | Int | Int | String | RG/P | ... |
| CID1 | 150 | RG1 | P1 | ID1 | RG | |
| CID2 | 150 | RG1 | P1 | ID1 | P | |
| CID3 | 100 | RG1 | P1 | ID1 | RG | |

Figure 3:
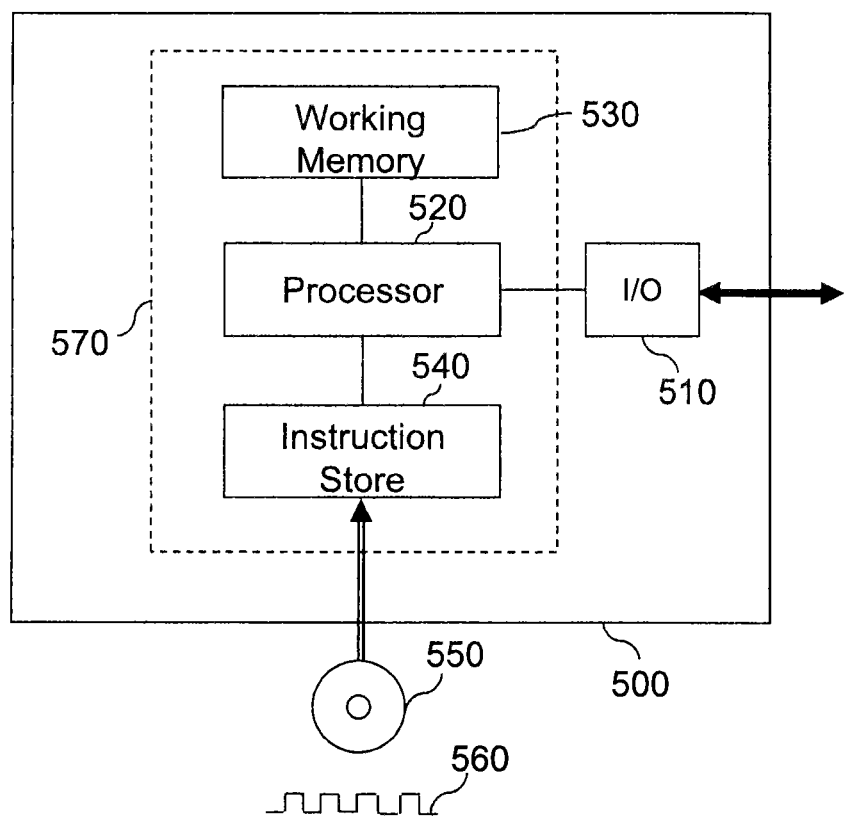
FIG. 3 is a schematic illustration of an example of programmable signal processing apparatus, which may be used to implement one or more of the functional components shown in FIG. 2A and FIG. 2B.

FIG. 3 shows an exemplary implementation of the data processing device 100, in the form of programmable signal processing hardware. The signal processing apparatus shown in FIG. 3 comprises an input/output (I/O) section 510 that functions as an interface module of the apparatus for sending requests for configuration data, resource locators and records described herein below to the backend server 200 via the cell phone network and the Internet 400, and receiving the configuration data and other information from the backend server 200, as will be described in the following.

The signal processing apparatus further comprises a processor 520, a working memory 530 and an instruction store 540 for storing computer-readable instructions defining the primary application 110 and computer-readable instructions defining the secondary application 120 which, when executed by the processor 520, cause the processor 520 to perform the processing operations hereinafter described. The instruction store 540 may comprise a RAM or similar type of memory, and the computer-readable instructions can be input thereto from a computer program product, such as a computer-readable storage medium 550 such as a CD-ROM, etc. or a computer-readable signal 560 carrying the computer-readable instructions.

In the present embodiment, the combination of the hardware components shown in FIG. 3, comprising the processor 520, the working memory 530 and the instruction store 540, is configured to implement the functionality of the reward-obtaining module 122 and the reward-claiming module 124 shown in FIG. 2A. Similarly, a programmable signal processing apparatus of the kind shown in FIG. 3 may be used to implement the functional components of the backend server 200 that are shown in FIG. 2B.

The processes performed by the smartphone in the present embodiment to execute the first electronic game so as to allow the selection and installation of the second electronic game, and to allow rewards earned by the user in the second electronic game to be passed to the first electronic game without the need for an Internet connection, will now be described with reference to FIGS. 4 to 10.

Figure 4:
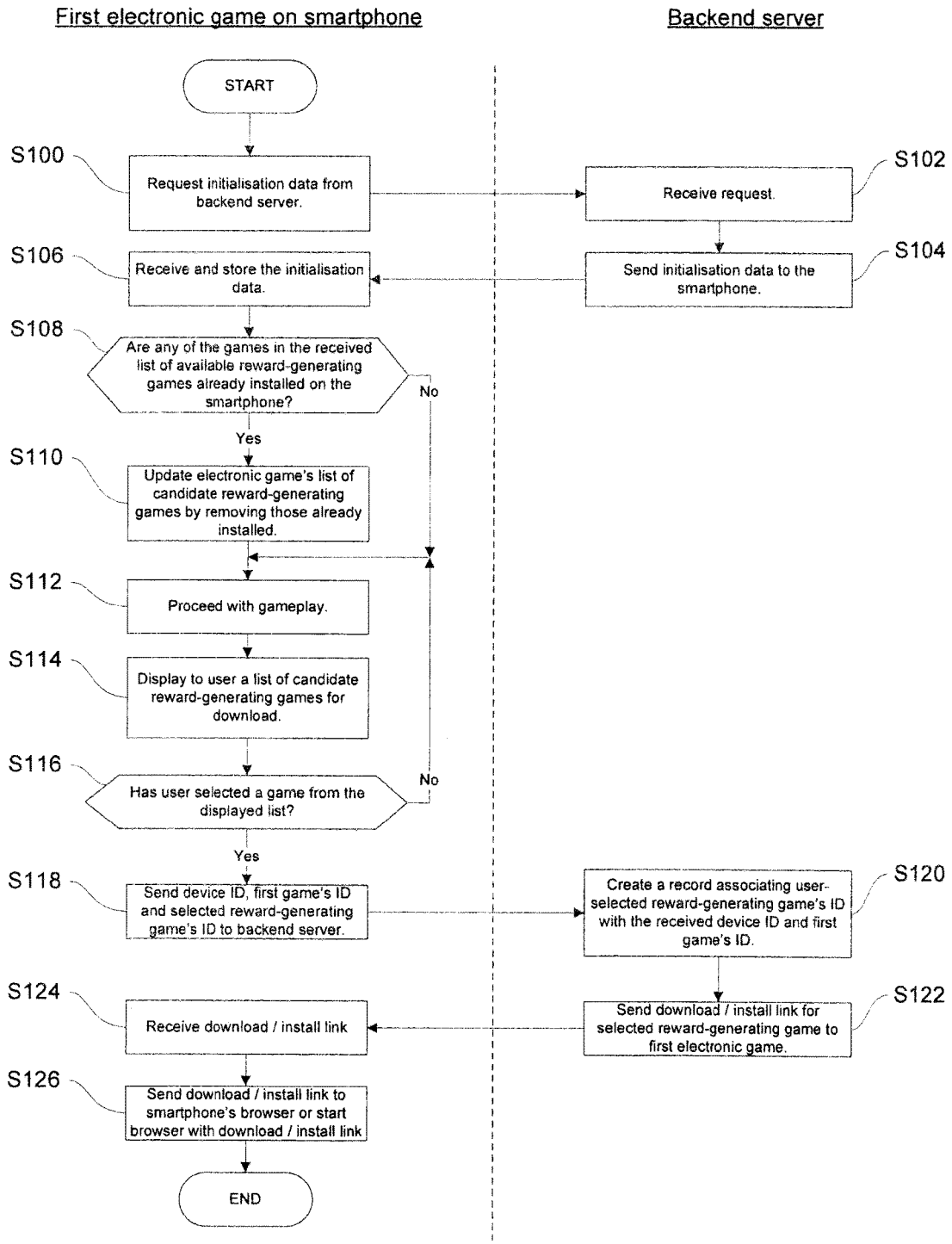
FIG. 4 is a flow diagram illustrating processes performed by the backend server and by an application in the form of a first electronic game described herein, when the first electronic game starts up for the first time after its installation.

Processes performed by the first electronic game of the present embodiment when it is first started up following its installation on the smartphone will now be described with reference to FIG. 4.

On its first start-up, the first electronic game performs an initialisation process during which it obtains a list of candidate reward-generating electronic games that is to be displayed to the user when the user plays the first electronic game, to allow the user to select a reward-generating electronic game that is to be downloaded to the smartphone from the application download server 300.

In more detail, in step S100, the first electronic game sends a request to the backend server 200 to receive initialisation data comprising a list of candidate reward-generating games that are available for download, wherein each of the reward-generating games is configured to generate a reward value when the user completes a predetermined task (for example, spending a predetermined amount of time playing the game, completing a level of the game, collecting a predetermined number of collectable items in the game, or achieving a predetermined score in the game). The requested initialisation data also includes a list of blacklisted games, a maximum reward value that the first electronic game should be allowed to accept, and priority data which defines an order of priority of the candidate reward-generating games. In step S102, the request for initialisation data is received by the receiver module 210 of the backend server 200.

The request for initialisation data, and some or all of the remaining messages that are communicated between applications running on the smartphone and an application running on the backend server 200, as described in the following, may be secured by encryption, using techniques well known to those skilled in the art.

The backend server 200 generates the list of candidate reward-generating games based on the information in Table 1 that is stored in the backend server database. More particularly, the candidate application identification module 260 of the backend server 200 generates a set of one or more identifiers each identifying a respective candidate reward-generating game for download from the application download server 300 to the smartphone, and generates a list comprising the generated one or more identifiers. The backend server 200 also generates the list of blacklisted games from the information in Table 2 that is also stored in the backend database. The games appearing in the blacklist are games whose reward claims should not be recognised by the first electronic game, as will be explained in the following. The maximum reward value is an upper reward value limit used to validate a reward passed to the first electronic game by a reward-generating game.

In step S104, the transmission module 230 of the backend server 200 sends the initialisation data to the first electronic game on the smartphone. In step S106, the initialisation data is received by the first electronic game and stored in the smartphone for subsequent use.

Next, the first electronic game checks the received list of candidate reward-generating games and removes from this list any reward-generating games that have already been installed on the smartphone. More specifically, in step S108, the first electronic game checks whether any of the games in the received list of available reward-generating games have already been installed on the smartphone. If none of the candidate reward-generating games have previously been installed on the smartphone, then the process proceeds to step S112. On the other hand, if at least one game from the list is determined to have been installed on the smartphone, then the process proceeds to step S110, in which the first electronic game updates the list of candidate reward-generating games by removing from this list the games that are already installed on the smartphone.

Following the initialisation process in steps S100 to S110, the first electronic game proceeds to run on the smartphone in step S112, allowing the user to play the game using e.g. the touch-screen of the smartphone. At a predetermined point in the game play (for example, when the user has completed a predetermined task such as completing a level of the game) or at point in the game that is randomly selected by the first electronic game or by the user (e.g. by the user pressing an icon displayed in a designated part of the smartphone's touch screen), the first electronic game displays to the user in step S114 a list of candidate reward-generating games that are available for download to the smartphone from the application download server 300 via the Internet 400. The games appearing in the list may be ordered using the received priority data, and may be represented in any desirable way, for example by name or an icon. In the present embodiment, the list is displayed as part of a message informing the user that rewards for use in the first electronic game can be obtained by downloading and playing one of the listed games. However, the message also gives the user the option of declining to select a game for installation, and to instead return to playing the first electronic game.

In step S116, the first application determines whether the user has selected a game from the displayed list for installation on the smartphone. If the user has not selected a game for installation but has indicated that he/she wishes to return to playing the first electronic game instead, then the process loops back to step S112. On the other hand, if the user has selected a game from the displayed list (e.g. by touching an icon on the smartphone's screen that is associated with the game), then the first electronic game receives the user's selection and obtains a resource locator for use in downloading the selected reward-generating game to the smartphone from the application download server 300 for installation as the second electronic game.

More specifically, in step S118, the first application obtains the resource locator by transmitting a resource locator request to a backend server 200 to request a resource locator for downloading the selected reward-generating game from the application download server 300. The resource locator request comprises a unique device identifier that uniquely identifies the smartphone (e.g. the smartphone's IMEI number or, more preferably, the IDFA (i.e. the Identifier for Advertisers, also abbreviated to IFA) on iOS® devices, and the 'Advertising ID' on Android® devices), a first identifier identifying the first electronic game, and a second identifier identifying the selected reward-generating electronic game.

In step S120, the receiver module 210 of the backend server 200 receives the message from the first electronic game, and the record-keeping module 220 of the backend server 200 creates a record in the backend server database, the record associating the identifier ("ID") of the selected reward-generating game with the unique ID of the smartphone and the ID of the first electronic game. This record is created in the part of the backend server database that is illustrated in Table 4, with the received device ID being recorded in the "DeviceID" field, the selected reward-generating game's ID being recorded in the "RGAppID" field, and the ID of the first electronic game being recorded in the "PAppID" field. In addition, the backend server 200 records an indication ("Yes") in the "DownloadRequested" field in Table 4 to indicate that the first electronic game identified in the "PAppID" field on the device identified in the "DeviceID" field has made a request to download the reward-generating game identified in the "RGAppID" field.

In response to the first application's resource locator request, the transmission module 230 of the backend server 200 transmits (in step S122) the resource locator in the form of a download link (such as a URL) that allows an application browser in the smartphone (e.g. the iTunes® app on an iOS® device) to find and download the selected reward-generating game to the smartphone. In step S124, the smartphone receives the requested resource locator from the backend server 200 and passes the resource locator to the first electronic game. Then, in step S126, the received download link is passed by the first electronic game to the application browser in the smartphone. In the present embodiment, the application browser requests the user to confirm that he/she wishes to download and install the selected reward-generating game on the smartphone and, after the user has confirmed that he/she wishes to do so, the selected reward-generating game is downloaded from the application download server 300 using the received resource locator, and installed as the second electronic game on the smartphone. It should be noted, however, that the user may choose to open the smartphone's application browser and find the selected reward-generating game by him/herself, without using the resource locator, and then download install the selected reward-generating game.

Following its installation on the smartphone, the second electronic game is configured to perform an initialisation process the first time it is started, which will now be described with reference to FIG. 5.

Once the second electronic game has been launched for the first time, it communicates with the backend server 200 in order to obtain configuration data that enables it to generate rewards for use in the first electronic game.

More specifically, in step S200, the second game obtains the unique device ID of the smartphone. Next, in step S202, the second electronic game generates and transmits to the backend server 200 a request to receive configuration data from the backend server 200, which comprises the unique device ID of the smartphone and the second identifier that identifies the second game to allow the backend server 200 to verify the validity of the request to receive configuration data. The request may, as in the present embodiment, also include a confirmation that the second electronic game has been installed on the smartphone.

Upon receiving the request for configuration data from the second game, the backend server 200 processes this request to determine whether the second electronic game was downloaded to the smartphone by the user using the first electronic game. If the second game is determined to have been downloaded by use of the first electronic game, namely by the user using the first game to selected the second game from the displayed list, rather than directly via the application browser (i.e. without using the first game, for example), then the backend server 200 supplies the relevant configuration data to the second electronic game. On the other hand, if the backend server 200 determines that the second electronic game was not downloaded and installed using the first electronic game, then the backend server 200 does not send configuration data to the second game, such that the second game remains unable to pass to the first game any rewards that the user has earned through playing the second game.

In more detail, in step S204 of FIG. 5, the receiver module 210 of the backend server 200 receives from the second electronic game the request for configuration data and, in step S206, the verification module 240 of the backend server 200 verifies the validity of the request to receive configuration data by checking the unique device identifier and the second identifier in the request to receive configuration data against the record created by the record-keeping module 220. More specifically, the verification module 240 checks whether there is a record in the backend server 200 database (more specifically, in Table 4) comprising a device identifier that matches the device identifier provided in the request. If such a record is found, the verification module 240 further determines in step S206 whether that record indicates that the first electronic game identified in the record has previously requested a resource locator for the second electronic game that is identified by the second identifier in the received request for configuration data (i.e. whether the record having the device ID and the second identifier has "Yes" indicated in the "DownloadRequested" field). If such a record is found and that record indicates that the first game identified in the record has previously requested a resource locator for the second electronic game that is identified in the received request for configuration data, then the checks in step S206 are passed, otherwise they are failed.

If the checks in step S206 are passed, then the process proceeds to step S208, wherein the record-keeping module 220 updates the record found in step S206 to indicate both of the current date and time, and that the second electronic game has been installed in the device that is identified in the record. This is achieved by the record-keeping module 220 entering the date and time of the install in the "DateOfInstall" field, and an indication ("Yes") in the "AppInstalled" field of Table 4.

When the validity of the received request for configuration data has been verified by the verification module 240, the transmission module 230 of the backend server 200 transmits the configuration data to the second electronic game, in step S210. The configuration data for the second electronic game comprises the ID of the first electronic game, and links to reward assets to be used when displaying rewards information in the second electronic game (e.g. icons, colours, etc.). These assets are stored in the part of the backend server's database that is illustrated in Table 3. The configuration data further comprises application start-up data for starting up the first game, which may be dependent on the smartphone's operating system. For example, the application start-up data may comprise the URL schema for starting the first game where the smartphone is an iOS® device, or a package name for starting the first game where the smartphone is an Android® device. The backend server 200 obtains the application start-up data from the part of the backend server database that is illustrated in Table 3. In addition, the configuration data includes the maximum reward value as well as a session reward limit, whose use is described below.

In step S212, the second electronic game receives and stores the configuration data sent by the backend server 200.

On the other hand, if no record of a request to download the second electronic game by the first electronic game is found in step S206, then the process may, as in the present embodiment, proceed to step S214, wherein the transmission module 230 of the backend server 200 sends a rejection notification to the second electronic game, and to step S126, wherein the second electronic game receives the rejection notification and displays a message to the user indicating that reward claiming has not been enabled for the second electronic game. Alternatively, the backend server 200 may perform no further processes when the outcome of the determination in step S206 is "No".

After the first and second electronic games have been installed on the smartphone and run to execute the initialisation processes that have been described above with reference to FIGS. 4 and 5, the second game is able to pass to the first game reward data comprising a reward value that is indicative of a reward earned by the user upon completing a predetermined task in the second game, without the need for the smartphone to connect to the Internet 400, any other kind of network, or any other device, as will now be explained by reference to FIGS. 6A, 6B and 7 to 9.

Figure 6A:
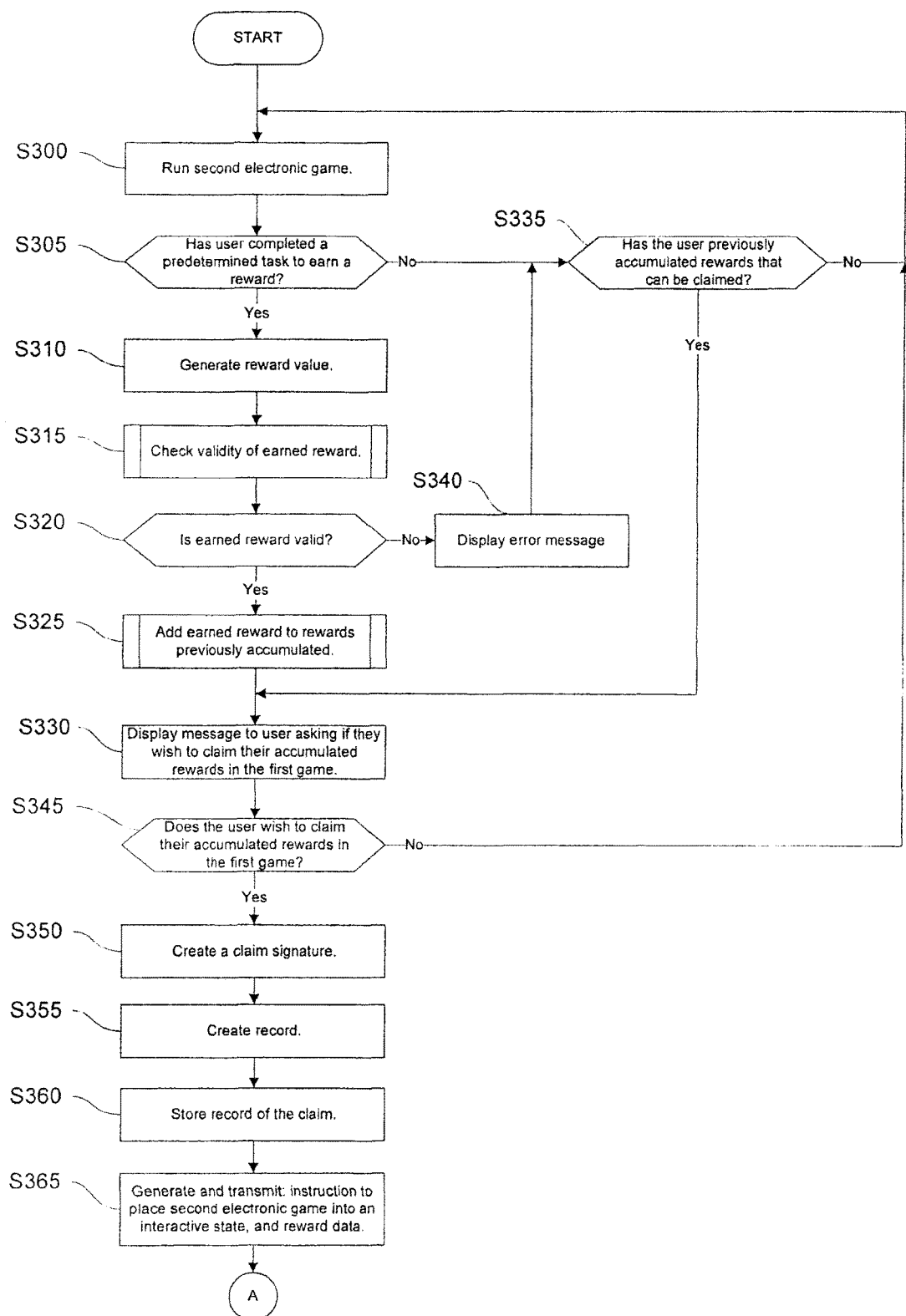
FIG. 6A is a flow diagram illustrating processes performed by the second electronic game, by which the user may accumulate rewards in the second electronic game, and submit a request to be credited with a reward in the first application that is based on the rewards earned in the second electronic game.

Referring firstly to FIG. 6A, in step S300, the second electronic game is run on the smartphone, allowing the user to play the game. The second electronic game may be one of the many different kinds of game known to those skilled in the art, such an infinite runner, a platform game, a level-based game or a village building game. While playing the second game, the reward-obtaining module 122 may award the user with a reward each time he/she completes a predetermined task in the second game, for example when the user spends a predetermined amount of time playing an infinite runner game, completing a level of a level-based game, collecting a predetermined number of collectable items in a platform game, or achieving a predetermined score. The reward-obtaining module 122 may reward the user for completing the same task repeatedly (e.g. each time the user accumulates a predetermined number of credits (e.g. coins), or each time the user has spent a required amount of time playing the game). Additionally or alternatively, the reward-obtaining module 122 may reward the user for completing different tasks. For example, the reward-obtaining module 122 may reward the user with a reward each time they collect a predetermined number of coins, and reward them with a larger reward when they complete a particular level of the game. Many other ways of rewarding the user for using the second game may be envisaged by those skilled in the art.

When the reward-obtaining module 122 determines that the user is to be rewarded for playing the second game in step S305, the process proceeds to step S310, wherein the reward-obtaining module 122 generates a reward value that associated with the task in the game that the user has completed. In the present embodiment, the reward value is given in units of 0.1 cents USD, which forms the unit of a universal currency that is accepted by the primary application 110 and all of the reward-generating applications stored by the application download server 300 for download to the smartphone by use of the primary application 110, as described above. Furthermore, the tasks are set such that, for example, one US dollar's-worth of rewards should take three hours to earn. In this example, it should take the user 12 seconds to earn a reward of 0.1 cents USD. The reward displayed to the user in the second game, on the other hand, need not be provided in units of the universal currency but may alternatively be provided in units (e.g. coins, lives, moves etc.) that are selected by the developer of the game.

It will, however, be appreciated that another denomination of a US dollar, a denomination of another real-world currency (e.g. GBP, Euro, JPY etc.), or a virtual currency that is recognised in the applications in the system of the present embodiment, may alternatively form a unit of the universal currency that is used in the present embodiment to transfer rewards earned in one application on the smartphone to another application on the smartphone.

The reward-claiming module 124 of the second electronic game may, as in the present embodiment, proceed to determine in step S315 whether the reward value generated by the reward-obtaining module 122 is valid based on the time that the user has spent playing the second game. An example of the process that may be performed by the reward-claiming module 124 in step S315 to verify the validity of the reward that has been generated by the reward-obtaining module 122 will now be described with reference to FIG. 7.

The reward-claiming module 124 of the present embodiment is configured to monitor the time spent by the user in playing the second game. In step S315-1, the reward-claiming module 124 compares this measured time with the time that the user is expected to take to earn the reward value on the above-mentioned basis that it should take three hours of game play to earn a reward equivalent to one USD in value. Thus, in step S315-1, the reward-claiming module 124 calculates the time that the user is expected to take to earn the reward value based on the reward value and a conversion factor relating the unit of reward value to time spent playing the game.

If the expected gameplay time exceeds the measured gameplay time by more than a predetermined amount (e.g. 30 minutes, to allow for users with higher levels of skill), the reward-claiming module 124 determines that the reward value generated by the reward-obtaining module 122 is unacceptably generous and therefore rejects the reward as invalid. The process then proceeds to step S315-2, in which the reward-claiming module 124 marks the reward as invalid, and the process continues to step S320 in FIG. 6A.

On the other hand, if the expected gameplay time does not exceed the measured gameplay time by more than the predetermined amount, the reward-claiming module 124 determines that the reward value generated by the reward-obtaining module 122 is reasonable and therefore accepts the reward as valid. The process may then continue to step S315-3.

In step S315-3, which may be performed even in the absence of the validity check performed in step 315-1, the reward-claiming module 124 determines whether the reward value generated by the reward-obtaining module 122 exceeds the session reward limit. If the reward value exceeds the session reward limit, then the reward is capped at the session reward limit by the reward-claiming module 124 in step S315-4, otherwise it is not capped. The reward value (whether or not it has been capped) is then marked as valid in step S315-5, the process continues to step S320 in FIG. 6A.

Referring again to FIG. 6A, in step S320, the reward-claiming module 124 responds to a determination that the reward value is valid by proceeding to step S325, in which it adds the validated reward value to an accumulated reward value obtained by summing valid reward values that have previously been generated by the reward-obtaining module 122. Further details of this process are shown illustrated in the flow diagram of FIG. 8.

Figure 8:
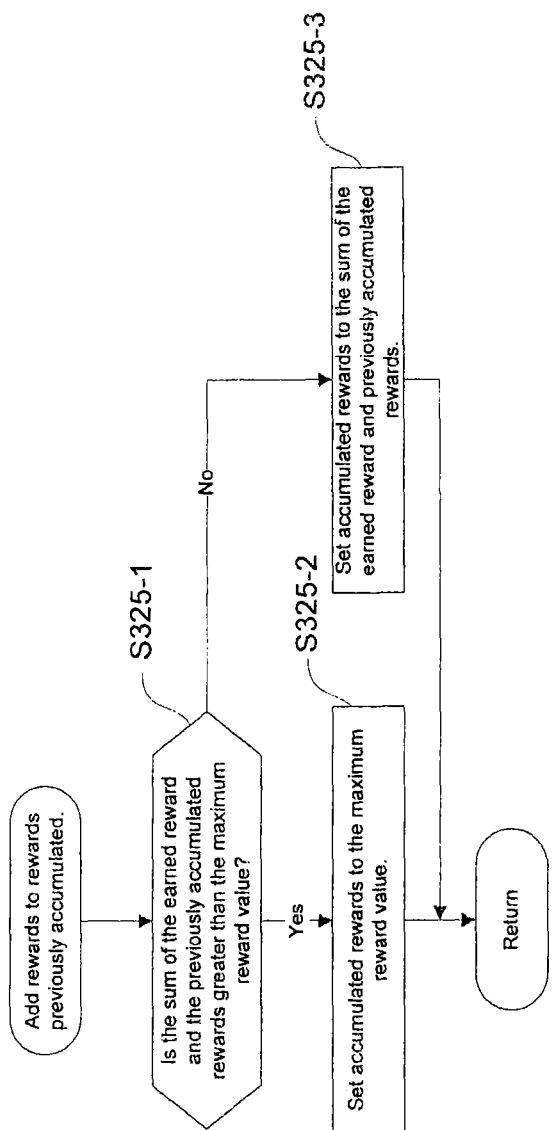
FIG. 8 is a flow diagram showing further details of the process performed in step S325 in FIG. 6A.

In step S325-1 shown in FIG. 8, the reward-claiming module 124 performs a check to determine whether the sum of the reward value generated by the reward-obtaining module 122 and the reward values from the reward-obtaining module 122 that have previously been accumulated is greater than the maximum reward value communicated to the smartphone in step S210 as part of the configuration data.

If it is determined in step S325-1 that the sum of the earned reward value and the previously accumulated reward values is greater than the maximum reward value, processing may proceed to step S325-2, where the total accumulated reward value is capped at the maximum reward value. The process then continues to step S330 in FIG. 6A.

However, if the sum of the earned reward value and the previously accumulated reward values is determined in step S325-1 to be less than or equal to the maximum reward value, the process proceeds to step S325-3, wherein the total accumulated reward value is set to the sum of the earned reward value and the previously accumulated reward values. The process then continues to step S330 in FIG. 6A.

Referring once again to FIG. 6A, if, at step S305, it is determined that the user has not completed a predetermined task in the second game, processing proceeds to step S335. In step S335, the reward-claiming module 124 checks whether the user has previously accumulated rewards which can be claimed for use in the first electronic game. If the user has previously accumulated rewards which can be claimed, the process proceeds to step S330. If the user has not previously accumulated rewards which can be claimed, the process loops back to step S300.

If the reward-claiming module 124 determines in step S320 that the latest reward earned by the user is invalid, the process may, as in the present embodiment, proceed to step S340, wherein the second electronic game displays an error message to the user informing the user that the reward he/she might have expected to earn by the point they have reached in the game cannot be awarded. The reward value generated by the reward-obtaining module 122 is discarded in this case. It should be noted that step S340 is optional and it may be preferable in other embodiments to omit it in order to avoid interrupting gameplay.

After at least one reward value has been generated by the reward-obtaining module 122 and its validity has been verified by the reward-claiming module 124 of the second electronic game, the second electronic game may give the user the option to claim their reward(s) so that it may be used in a first electronic game. If the user chooses to claim the reward(s), the second electronic game passes the details of the reward to the first electronic game so that the user can benefit from using the reward in the first electronic game, as will now be explained.

In step S330, the second electronic game displays a message to the user inviting the user to indicate whether he/she wishes to claim their accumulated rewards. Next, in step S345, the second electronic game determines whether or not the user has selected to claim their accumulated rewards. If the user selects not to claim their accumulated rewards, the process returns to step S300.

However, if the user indicates that he/she does wish to claim their accumulated rewards, the reward-claiming module 124 generates and transmits an instruction to place the first electronic game into an interactive state, and the reward-claiming module 124 further generates and transmits reward data on the basis of the reward value for use by the first electronic game when in the interactive state. Further details of the reward data are provided in the following.

The instruction to place the first electronic game into an interactive state may cause the operating system of the smartphone to launch the first electronic game (i.e. perform a "cold start" by loading the first electronic game into the smartphone's random access memory (RAM) and then running the first electronic game in the foreground) so that the first game's user interface is displayed on the smartphone's screen, allowing the user to interact with it. Alternatively, the instruction to place the first electronic game into an interactive state may cause the smartphone's operating system to manage the first electronic game, after it has been launched and is running in the background, so that the first electronic game runs in the foreground and the user is thus able to interact with the user interface of the first electronic game while it is displayed on the smartphone's screen. Thus, it will be appreciated that the placing of an application into an "interactive state" should be understood to refer to causing the application to be executed on the smartphone such that the user interface of the application is displayed by the smartphone to allow the user to interact with the application's user interface. However, prior to generating and transmitting the instruction and the reward data, the reward-claiming module 124 generates the reward data so that it includes a signature for verifying the validity of the reward data, as will now be explained.

In step S350, the reward-claiming module 124 creates the signature by generating an encoding based on at least one of the first identifier that identifies the first electronic game, the second identifier that identifies the second electronic game, a time stamp obtained from the smartphone's system clock, and a value indicative of the reward value that has been used to generate the reward data. The reward-claiming module 124 may, as in the present embodiment, use a Hash function to generate the encoding based on two, three or all of the aforementioned parameters. More particularly, the signature may, as in the present embodiment, be generated using the following formula: SHA1(<Second electronic game ID>+<First electronic game ID>+<Date and time stamp>+<Reward Amount>), where < . . . > indicates the value of the parameter between the angle brackets, "+" is a concatenation operator and SHA1 refers to the Secure Hash Algorithm function SHA-1.

Next, in step S355, the reward-claiming module 124 creates a record indicating that the instruction and the reward data have been generated, the record including a unique claim ID which uniquely identifies a reward claim request made by the user. The record is stored in the smartphone so that its data can later be transmitted to the backend server 200, to allow the backend server 200 to keep track of the reward claims made by the user.

Next, in step S360, the details of the reward being claimed are stored by the reward-claiming module 124. Processing then proceeds to step S365, wherein the reward-claiming module 124 uses the above-mentioned configuration data to generate and transmit the reward data and the instruction to place the first electronic game into the interactive state. More specifically, in the present embodiment, the second electronic game starts up the first electronic game using the URL schema, which forms part of the reward data and which has been provided during initialisation of the second electronic game in step S210, as explained above. The reward data further comprises the following parameters, which are included in a URI generated by the reward-claiming module 124:

The Reward Amount. This is the size of the reward claimed specified in the universal currency which is used by all of the reward-generating applications;
The second identifier identifying the second electronic game;
The first identifier identifying the first electronic game for which rewards are being claimed;
The claim signature generated in step S350;
The unique claim ID generated in step S355; and
The device ID of the smartphone.

Figure 6B:
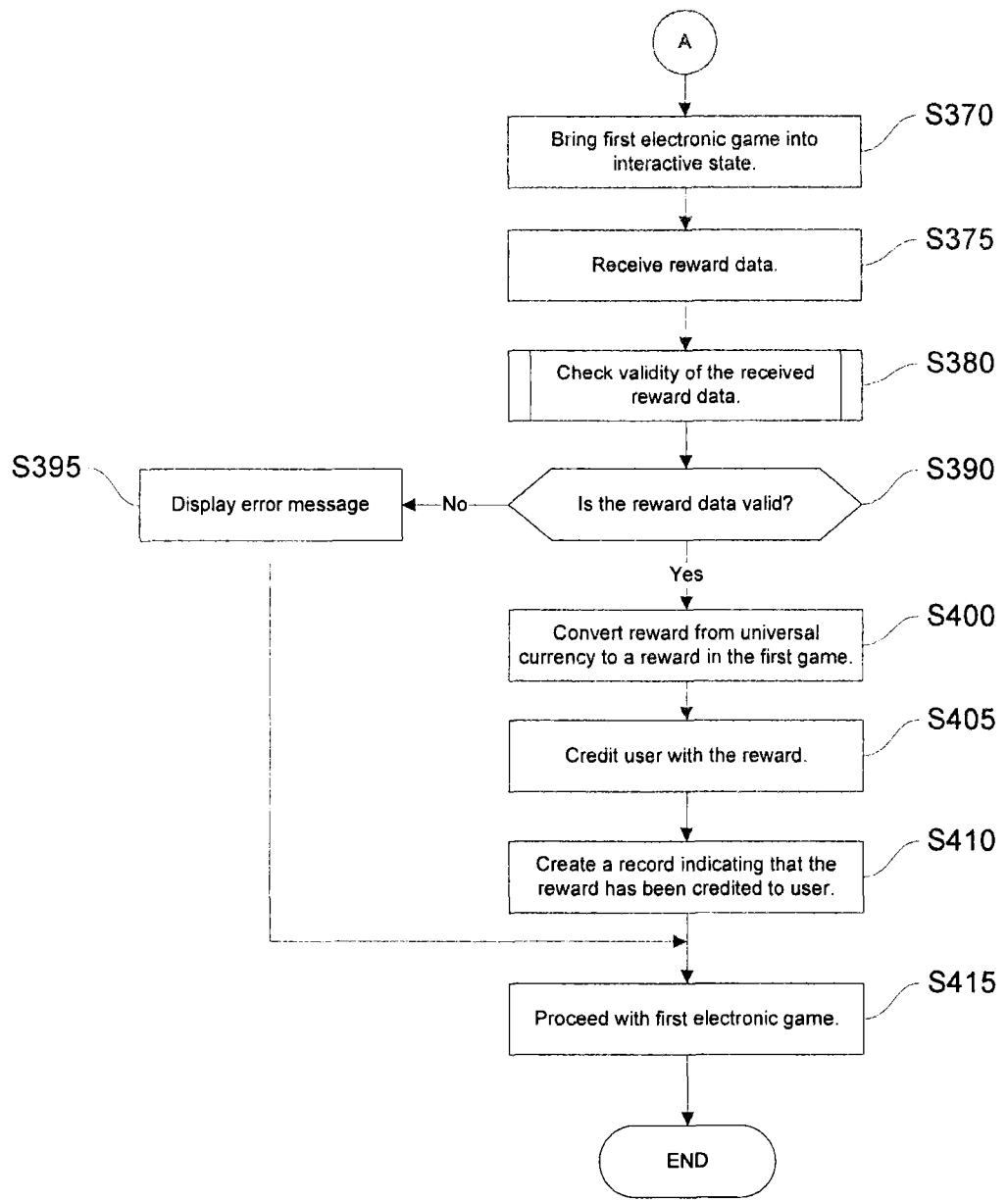
FIG. 6B is a flow diagram illustrating processes performed by the first electronic game, by which the user may be credited with a reward that is based on the rewards earned in the second electronic game.
Figure 7:
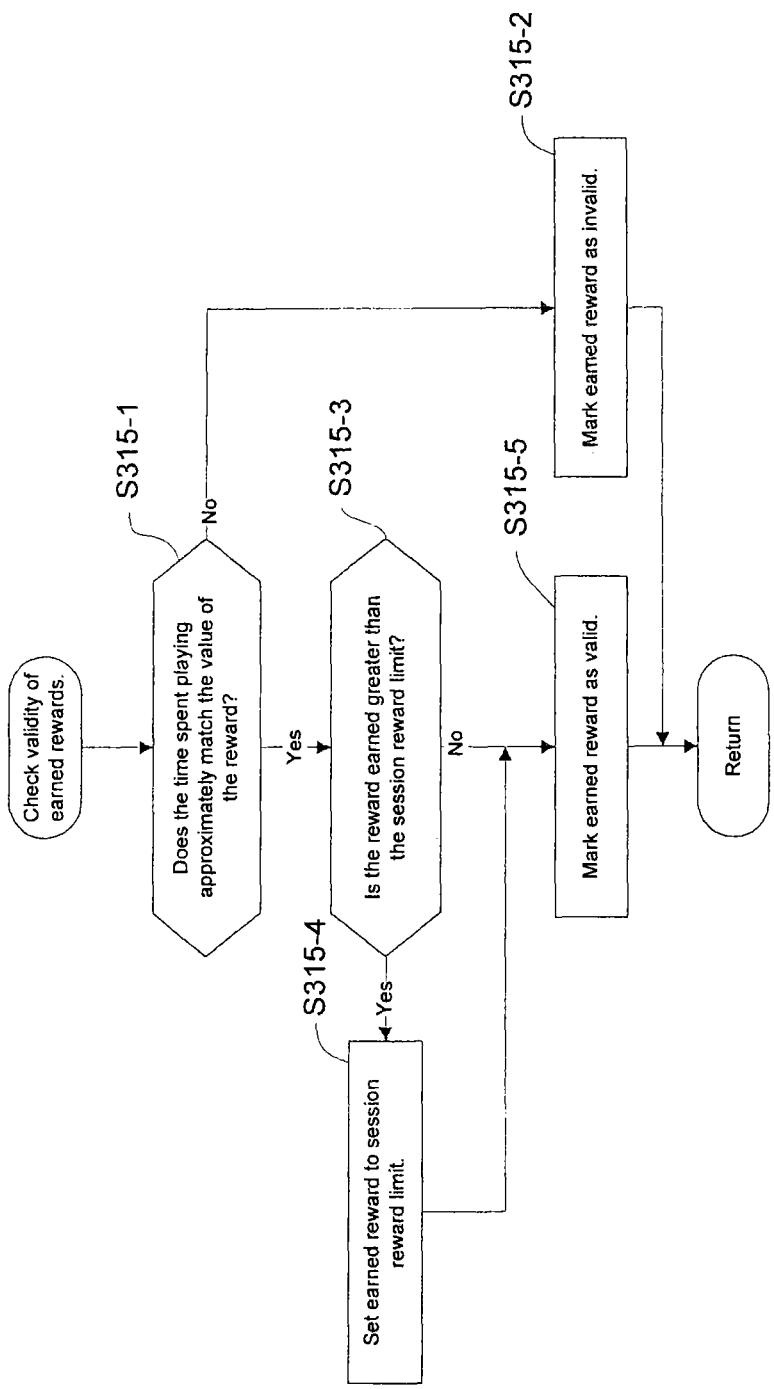
FIG. 7 is a flow diagram showing further details of the process performed in step S315 in FIG. 6A.
Figure 9:
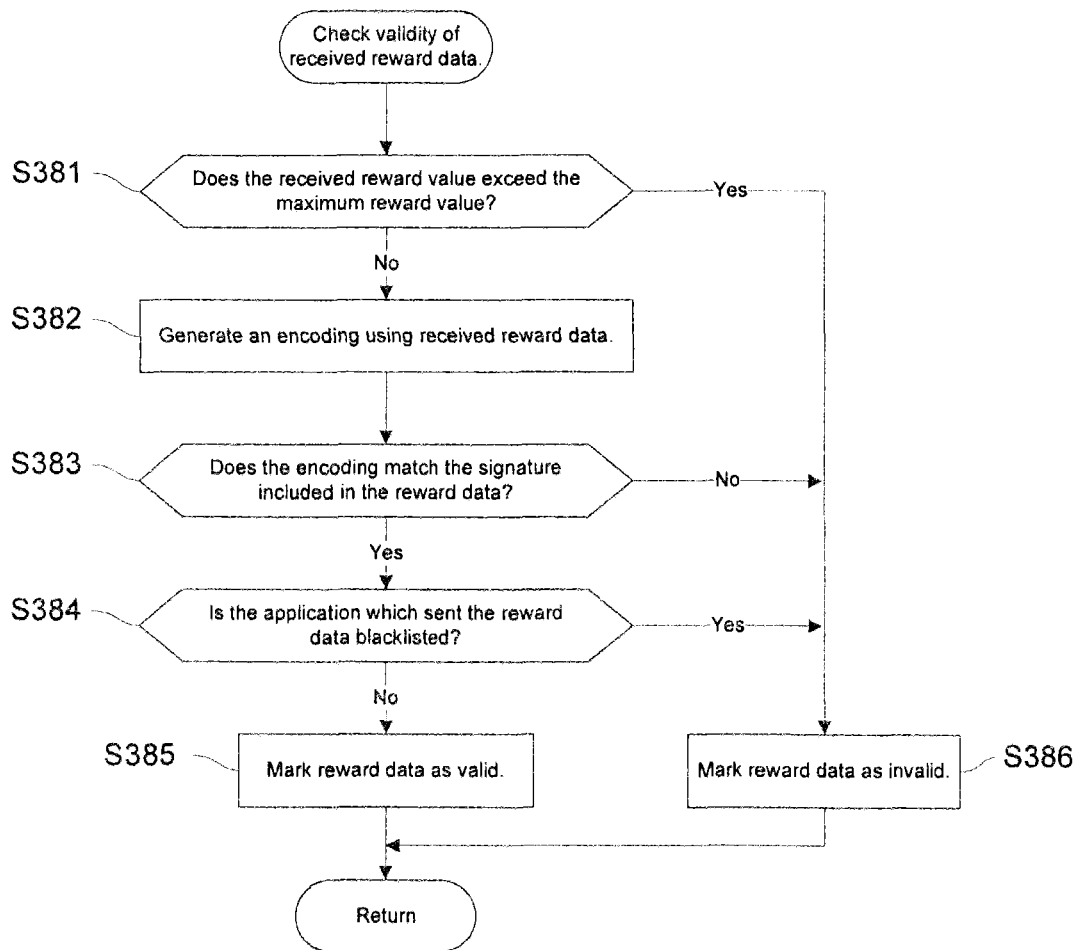
FIG. 9 is a flow diagram showing further details of the process performed in step S380 in FIG. 6B.

The processes by which the first electronic game starts up, verifies the validity of the reward data, and credits the user with the reward earned in the second electronic game will now be described with reference to FIGS. 6B and 9.

In step S370, the instruction generated by the reward-claiming module 124 in step S365 causes the first electronic game to be brought into the interactive state by the smartphone's operating system, for example by the operating system loading and launching the first electronic game, or by changing the first electronic game from running in the background to run in the foreground.

In step S375, the first electronic game, having been brought into the interactive state, passively receives the reward data generated by the reward-claiming module 124. The first electronic game receives the reward data in response to the smartphone's operating system pushing the reward data to the first electronic game. However, in another embodiment, the second electronic game may alternatively push the reward data to the first electronic game. The first electronic game may, as in the present embodiment, use an SDK (Software Developer Kit) API call to store the reward data in local memory of the smartphone (e.g. the working memory 530 shown in FIG. 3).

Then, in step S380, the first electronic game checks the validity of the received reward data. To do this, the first electronic game may, as in the present embodiment, use a different SDK API call to read the reward data from the local memory, decode it and check the validity of the reward data. An example of a process by which the first electronic game uses a reward-verifying module in the exemplary form of an SDK API to verify that the received reward data is valid will now be described with reference to FIG. 9.

As shown in the flow diagram of FIG. 9, the SDK API of the first electronic game used in step S380 firstly determines, in step S381, whether the reward value that has been extracted from the reward data exceeds the maximum reward value that has been received by the first electronic game in step S106, determining that the received reward data is valid when the reward value is equal to or below the maximum reward value. If the reward value is determined not to be equal to or below the maximum reward value, then the API determines that the reward value is unacceptably large and proceeds to mark the reward data as invalid, in step S386.

On the other hand, if the check in step S381 is passed, then the API performs a further validity check using other information that has been included as part of the reward data, as will now be explained.

As noted above, the reward data comprises a second identifier that identifies the second electronic game, a date and time stamp, and a signature for verifying validity of the reward data. The API of the first electronic game performs the further check to verify that the reward data is valid by generating in step S382 an encoding based on the parameters that have been used to generate the signature in the reward data. In the present embodiment, the API of the first electronic game thus generates in step S382 an encoding based on the identifier of the first electronic game, and received values of the second identifier, the date and time stamp, and the reward value. More specifically, in the present embodiment, the API generates this encoding by evaluating a Hash function using the same formula as was used by the reward-claiming module 124 to generate the signature in step S350, namely: SHA1(<Second electronic game ID>+<First electronic game ID>+<Date and time stamp>+<Reward Amount>).

Then, in step S383, the first electronic game's API compares the generated encoding with the signature in the received reward data, and determines that the received reward data is valid when the generated encoding is the same as the signature in the reward data. If the generated encoding is not found to match the signature in step S383, then the API proceeds to mark the reward data as invalid, in step S386.

However, if the generated encoding is determined to match (i.e. be the same as) the signature in step S383, then the API determines in step S384 whether the application which sent the reward data appears in the black-list which was provided to the first electronic game in step S106, as part of the initialisation data. If the application which sent the reward data is determined to have been black-listed, then the API proceeds to mark the reward data as invalid, in step S386. Otherwise, the reward data is marked as valid, in step S385. The process then proceeds to step S390 in FIG. 6B.

Referring again to FIG. 6B, in step S390, the API makes a decision based on whether the reward data was determined to be valid, causing the first electronic game to display an error message to the user in step S395 if the reward data was found to be invalid, and proceeding to step S400 if the reward data was found to be valid.

In step S400, the reward value included in the reward data is converted by the first electronic game from the universal currency to a reward that is used in the first electronic game, for example to give the user a reward in the form of one or more extra moves, or a number points lives etc. that are commensurate in value to the reward value expressed in the universal currency. Then, in step S405, the first electronic game credits the user with the reward.

Next, in step S410, the first electronic game creates a record of the reward having been credited to the user. This record may later be sent to the backend server 200 in order to track the level of rewards being claimed and other parameters. The first electronic game then proceeds to run as normal, in step S415.

The first and second electronic games may, for time to time, when an Internet connection is available, flush the records generated in steps S360 and S410 to the backend server 200 in other to allow the backend server 200 to keep track of successful reward claims that have been made by the user.

Figure 10:
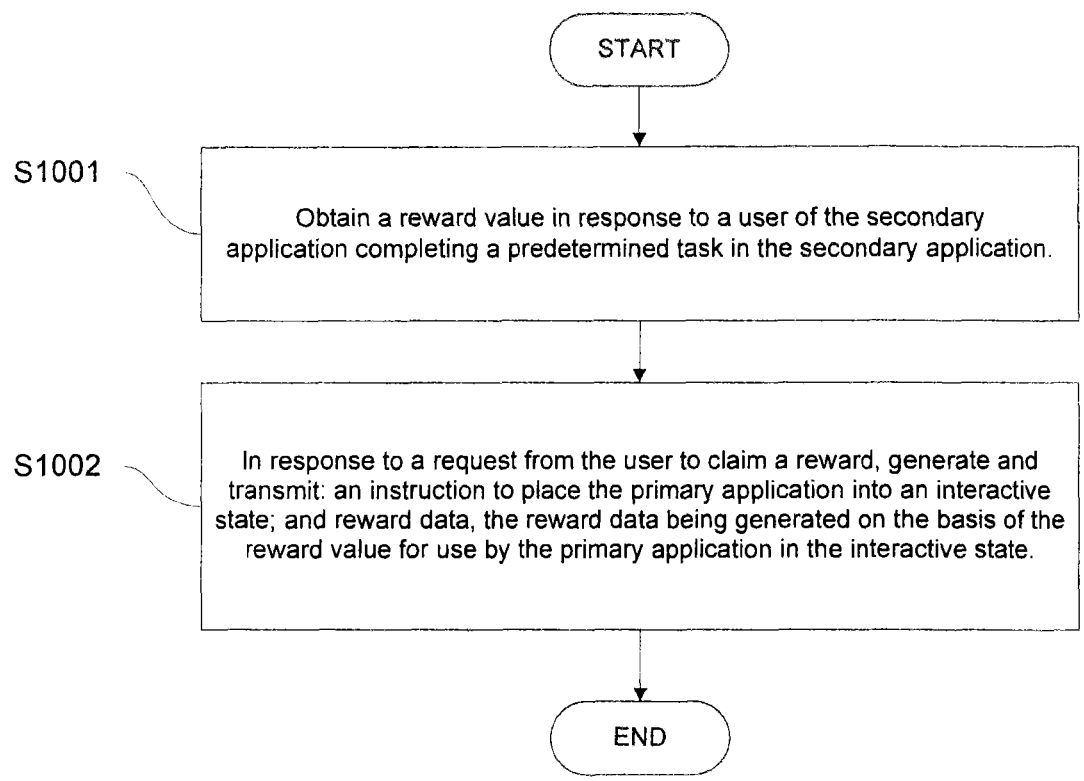
FIG. 10 is a flow diagram showing processes performed by the second electronic game in the embodiment, by which the user earns a reward in the second electronic game, and by which reward data is passed to the first electronic game.

It will be appreciated from the foregoing that the secondary application 120, when executed on the smartphone, performs processes as illustrated in the flow diagram of FIG. 10.

More particularly, in step S1001, the secondary application 120 obtains a reward value in response to a user of the secondary application 120 completing a predetermined task in the secondary application 120.

Then, in step S1002, in response to a request from the user to claim a reward, the secondary application 120 generates and transmits: an instruction to place the primary application 110 into an interactive state; and reward data, the reward data being generated on the basis of the reward value for use by the primary application 110.

Figure 11:
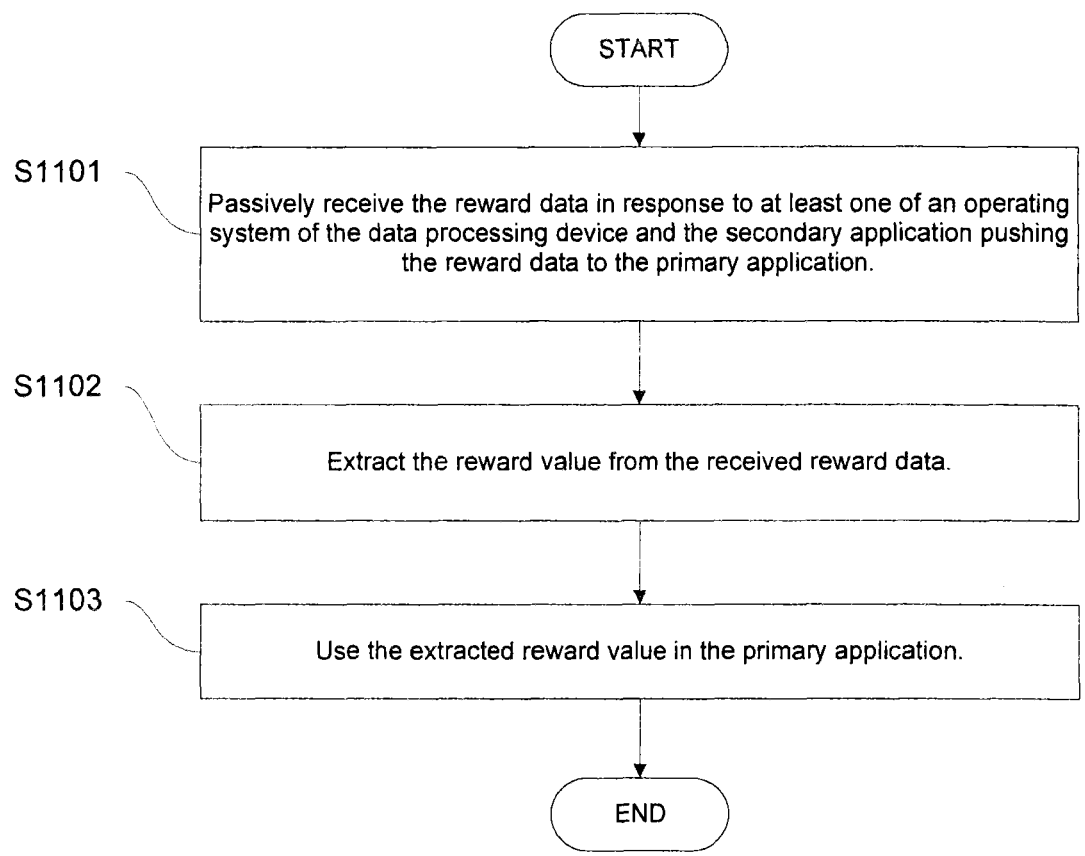
FIG. 11 is a flow diagram showing processes performed by the first electronic game in the embodiment, by which the first electronic game receives the reward data from the second electronic game and extracts a reward value therefrom for use in the first electronic game.

It will be also appreciated from the foregoing that the primary application 110, when executed on the smartphone, performs processes as illustrated in the flow diagram of FIG. 11.

More particularly, in step S1101, the primary application 110 passively receives the reward data in response to at least one of an operating system of the smartphone and the secondary application 120 pushing the reward data to the primary application 110. In step S1102, the primary application 110 extracts the reward value from the received reward data. Then, in step S1103, the primary application 110 uses the extracted reward value.

In a further embodiment, there is provided a non-transitory storage medium storing computer program instructions which, when executed by a data processing device, cause the data processing device to communicate with a second data processing device via the Internet, by:
receiving from a first application running on the second data processing device a resource locator request requesting a resource locator for downloading from an application download server a second application which is to be installed on the second data processing device, the resource locator request comprising:
    a unique device identifier that uniquely identifies the second data processing device;
    a first identifier identifying the first application; and
    a second identifier identifying the second application;
creating a record associating the unique device identifier with the first and second identifiers;
transmitting the requested resource locator to the second data processing device;
receiving, after the second application has been installed on the second data processing device, a request from the second application to receive configuration data from the data processing device to enable the second application to provide the first application with an indication of a reward earned by a user upon completing a predetermined task in the second application, wherein the configuration data comprises the first identifier, and wherein the request to receive configuration data comprises the unique device identifier and the second identifier;

verifying validity of the request to receive configuration data by checking the unique device identifier and the second identifier in the request to receive configuration data against the created record;

generating the requested configuration data when the validity of the request to receive configuration data has been verified; and transmitting the generated configuration data to the second data processing device.

In the storage medium of the further embodiment described above the instructions may comprise instructions which, when executed, further cause the data processing device to: generate one or more identifiers each identifying a respective candidate application for download from the application download server by the second data processing device; and transmit the identifiers to the second data processing device for use by the first application to generate the resource locator request.

The computer program instructions stored in the above-described storage medium may be loaded into, and executed by, the backend server 200 to perform the operations in the embodiment described above.

Figure 12:
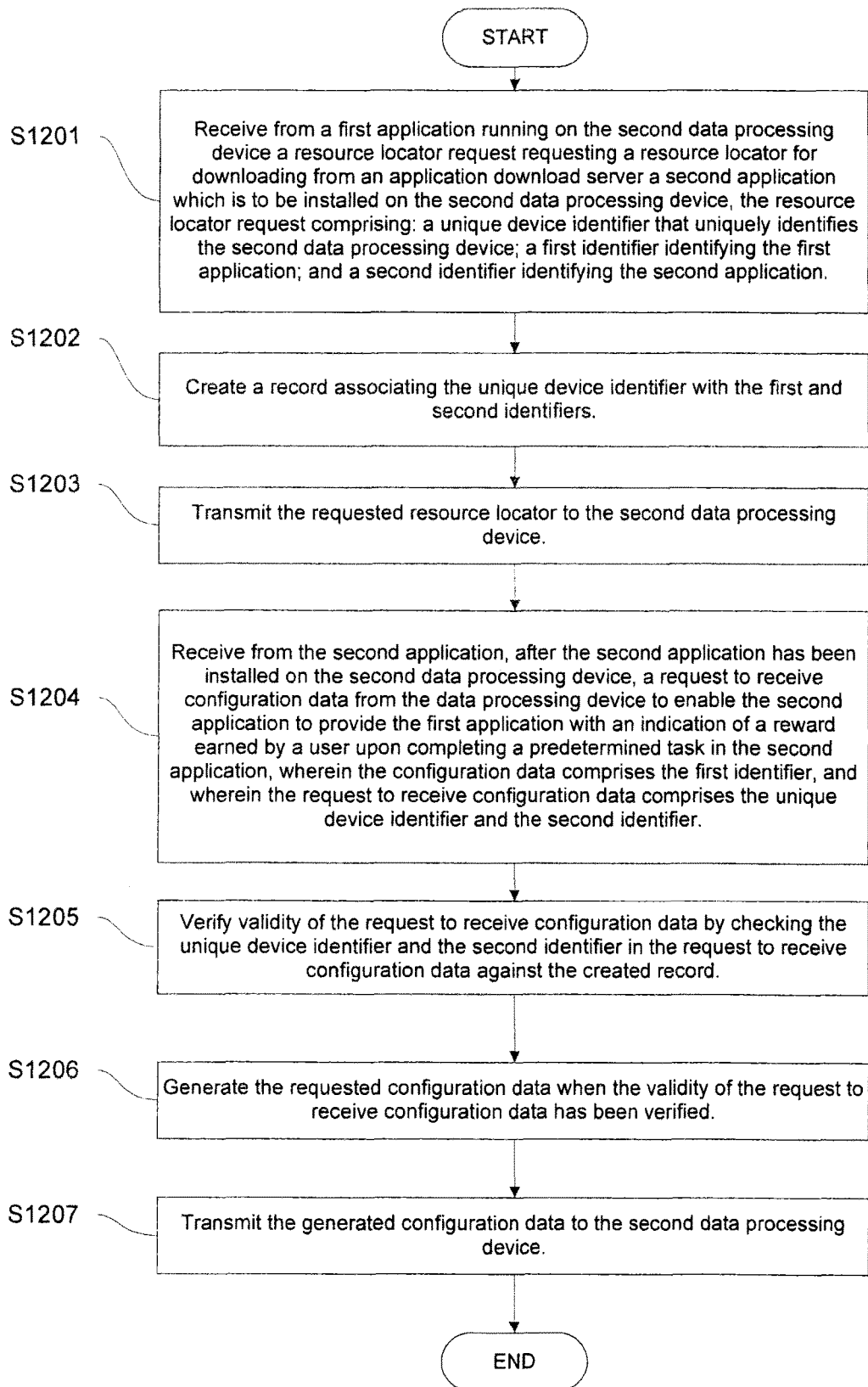
FIG. 12 is a flow diagram showing processes performed by the backend server in the embodiment.

It will be appreciated from the foregoing description that the backend server 200 is an example of a first data processing device that is configured to perform processes as illustrated in the flow diagram of FIG. 12 to communicate via the Internet with a second data processing device (as exemplified by the smartphone 100 in the embodiment).

More particularly, in step S1201, the first data processing device receives from a first application running on the second data processing device a resource locator request requesting a resource locator for downloading from an application download server a second application which is to be installed on the second data processing device, the resource locator request comprising: a unique device identifier that uniquely identifies the second data processing device; a first identifier identifying the first application; and a second identifier identifying the second application.

In step S1202, the first data processing device creates a record associating the unique device identifier with the first and second identifiers.

In step S1203, the first data processing device transmits the requested resource locator to the second data processing device.

In step S1204, the first data processing device receives from the second application, after the second application has been installed on the second data processing device, a request to receive configuration data from the data processing device to enable the second application to provide the first application with an indication of a reward earned by a user upon completing a predetermined task in the second application, wherein the configuration data comprises the first identifier, and wherein the request to receive configuration data comprises the unique device identifier and the second identifier.

In step S1205, the first data processing device verifies the validity of the request to receive configuration data by checking the unique device identifier and the second identifier in the request to receive configuration data against the created record.

In step S1206, the first data processing device generates the requested configuration data when the validity of the request to receive configuration data has been verified.

In step S1207, the first data processing device transmits the generated configuration data to the second data processing device.

The above-described method, which may be performed by the backend server to provide the functionality described above with reference to the Figures, may further comprise: generating one or more identifiers each identifying a respective candidate application for download from the application download server by the second data processing device; and transmitting the identifiers to the second data processing device for use by the first application to generate the resource locator request.

MODIFICATIONS

Many modifications and variations of the above-described embodiments are possible.

For example, the reward-obtaining module 122 described above is configured to obtain the reward value by generating it in response to the user completing a predetermined task in the secondary application 120. However, the reward-obtaining module 122 need not have the capability to calculate or otherwise generate the reward value itself. For example, in an alternative embodiment, the reward-obtaining module 122 may obtain the reward value by communicating with the backend server 200 to notify the backend server 200 that the user has completed a predetermined task in the secondary application, and receiving from the backend server 200 a reward value that the backend server has generated based on the notification.

The invention claimed is:

1. A server comprising:
    a receiver module configured to receive from a first application running on a data processing device a resource locator request requesting a resource locator for downloading from an application download server a second application that is to be installed on the data processing device, wherein the resource locator request includes:
        a unique device identifier that uniquely identifies the data processing device,
        a first identifier identifying the first application, and
        a second identifier identifying the second application;
    a record keeping module configured to create a record associating the unique device identifier with the first and second identifiers;
    a transmission module configured to transmit the requested resource locator to the data processing device,
    wherein the receiver module is further configured to receive from the second application, after the second application has been installed on the data processing device, a request to receive configuration data from the server to enable the second application to provide the first application with an indication of a reward earned by a user upon completing a predetermined task in the second application, wherein the configuration data includes the first identifier, and wherein the request to receive configuration data includes the unique device identifier and the second identifier;

a verification module configured to verify validity of the request to receive configuration data by:
   checking the unique device identifier and the second identifier in the request to receive configuration data against the record created by the record keeping module,
   determining if the second application was obtained via the first application,
   wherein when it is determined that the second application was obtained via the first application, then a supply of the configuration data is permitted, and
   wherein when it is determined that the second application was not obtained via the first application data, then the validity is not verified and the supply of the configuration data is prohibited; and
a configuration data generating module configured to generate the requested configuration data when the verification module verifies the validity of the request to receive configuration data,
wherein the transmission module is further configured to transmit the generated configuration data to the data processing device.

2. The server according to claim 1, further comprising:
a candidate application identification module configured to generate one or more identifiers each identifying a respective candidate application for download from the application download server by the data processing device,
wherein the transmission module is further configured to transmit the identifiers to the data processing device for use by the first application to generate the resource locator request.

3. A non-transitory computer-readable storage medium storing instructions that, when executed by one or more processors of a server, cause the server to:
   receive from a first application running on a data processing device a resource locator request requesting a resource locator for downloading from an application download server a second application that is to be installed on the data processing device, wherein the resource locator request includes:
      a unique device identifier that uniquely identifies the data processing device,
      a first identifier identifying the first application, and
      a second identifier identifying the second application;
   create a record associating the unique device identifier with the first and second identifiers;
   transmit the requested resource locator to the data processing device;
   receive from the second application, after the second application has been installed on the data processing device, a request to receive configuration data from the server to enable the second application to provide the first application with an indication of a reward earned by a user upon completing a predetermined task in the second application, wherein the configuration data includes the first identifier, and wherein the request to receive configuration data includes the unique device identifier and the second identifier;
   verify validity of the request to receive configuration data by:
      checking the unique device identifier and the second identifier in the request to receive configuration data against the created record,
      determining if the second application was obtained via the first application,
      wherein when it is determined that the second application was obtained via the first application, then a supply of the configuration data is permitted, and
      wherein when it is determined that the second application was not obtained via the first application data, then the validity is not verified and the supply of the configuration data is prohibited;
   generate the requested configuration data when the validity of the request to receive configuration data has been verified; and
   transmit the generated configuration data to the data processing device.

4. The non-transitory computer-readable storage medium according to claim 3, wherein the instructions comprise instructions that, when executed, further cause the server to:
   generate one or more identifiers each identifying a respective candidate application for download from the application download server by the data processing device; and
   transmit the identifiers to the data processing device for use by the first application to generate the resource locator request.

5. A method performed by a server, the method comprising:
   receiving from a first application running on a data processing device a resource locator request requesting a resource locator for downloading from an application download server a second application that is to be installed on the data processing device, wherein the resource locator request includes:
      a unique device identifier that uniquely identifies the data processing device,
      a first identifier identifying the first application, and
      a second identifier identifying the second application;
   creating a record associating the unique device identifier with the first and second identifiers;
   transmitting the requested resource locator to the data processing device;
   receiving from the second application, after the second application has been installed on the data processing device, a request to receive configuration data from the server to enable the second application to provide the first application with an indication of a reward earned by a user upon completing a predetermined task in the second application, wherein the configuration data includes the first identifier, and wherein the request to receive configuration data includes the unique device identifier and the second identifier;
   verifying validity of the request to receive configuration data by:
      checking the unique device identifier and the second identifier in the request to receive configuration data against the created record,
      determining if the second application was obtained via the first application,
      wherein when it is determined that the second application was obtained via the first application, then a supply of the configuration data is permitted, and
      wherein when it is determined that the second application was not obtained via the first application data, then the validity is not verified and the supply of the configuration data is prohibited;
   generating the requested configuration data when the validity of the request to receive configuration data has been verified; and
   transmitting the generated configuration data to the second data processing device.

6. The method according to claim 5, further comprising:
generating one or more identifiers each identifying a respective candidate application for download from the application download server by the data processing device; and
transmitting the identifiers to the data processing device for use by the first application to generate the resource locator request.

* * * * *